United States Patent
Cho et al.

(10) Patent No.: US 9,761,848 B2
(45) Date of Patent: Sep. 12, 2017

(54) BATTERY MODULE

(71) Applicant: SAMSUNG SDI CO., LTD., Yongin-si, Gyeonggi-do (KR)

(72) Inventors: Su-Sang Cho, Yongin-si (KR); Eun-Gyeong Gu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 80 days.

(21) Appl. No.: 14/561,125

(22) Filed: Dec. 4, 2014

(65) Prior Publication Data

US 2015/0162592 A1 Jun. 11, 2015

(30) Foreign Application Priority Data

Dec. 9, 2013 (KR) ........................ 10-2013-0152644

(51) Int. Cl.
*H01M 2/34* (2006.01)
*H01M 10/0525* (2010.01)
*H01M 2/10* (2006.01)
*H01M 10/42* (2006.01)

(52) U.S. Cl.
CPC ....... *H01M 2/1072* (2013.01); *H01M 2/1022* (2013.01); *H01M 2/347* (2013.01); *H01M 10/4257* (2013.01); *H01M 2220/20* (2013.01); *H01M 2220/30* (2013.01)

(58) Field of Classification Search
CPC ......... H01M 10/4257; H01M 2220/20; H01M 2220/30; H01M 2/1022; H01M 2/1072; H01M 2/347
See application file for complete search history.

(56) References Cited

U.S. PATENT DOCUMENTS

| 5,224,870 A | * | 7/1993 | Weaver | A61B 5/0404 |
|---|---|---|---|---|
| | | | | 429/97 |
| 2009/0233163 A1 | * | 9/2009 | Fang | H01M 2/1022 |
| | | | | 429/99 |
| 2010/0047676 A1 | | 2/2010 | Park et al. | |
| 2011/0255250 A1 | * | 10/2011 | Dinh | G03B 15/03 |
| | | | | 361/749 |
| 2012/0045665 A1 | * | 2/2012 | Park | H01M 2/1022 |
| | | | | 429/7 |
| 2012/0052331 A1 | * | 3/2012 | Park | H01M 2/202 |
| | | | | 429/7 |

(Continued)

FOREIGN PATENT DOCUMENTS

| JP | 2012-182079 A | 9/2012 |
|---|---|---|
| KR | 10-2007-0065560 | 6/2007 |

OTHER PUBLICATIONS

Machine English translation of JP 2012-182079 A, published Sep. 20, 2012, 18 pages.

*Primary Examiner* — Carlos Barcena
(74) *Attorney, Agent, or Firm* — Lewis Roca Rothgerber Christie LLP (57) ABSTRACT

A battery module includes a plurality of unit batteries, a holder accommodating the unit batteries and including a pin extending from the holder, a protective circuit module electrically coupled to the plurality of unit batteries, and a coupling member coupled to the pin to fix the protective circuit module to the holder. The holder may include a boss supporting the protective circuit module. The protective circuit module may define a coupling opening configured to receive the pin.

14 Claims, 6 Drawing Sheets

(56) References Cited

U.S. PATENT DOCUMENTS

| | | | |
|---|---|---|---|
| 2012/0190252 A1* | 7/2012 | Pavlinsky | H01M 10/425 439/775 |
| 2012/0231303 A1* | 9/2012 | Kim | H01M 2/1066 429/7 |
| 2012/0308849 A1* | 12/2012 | Tortstensson | H01M 2/1072 429/7 |
| 2013/0202919 A1 | 8/2013 | Hwang | |
| 2014/0017533 A1* | 1/2014 | Nishihara | H01M 2/06 429/93 |

* cited by examiner

BATTERY MODULE

CROSS-REFERENCE TO RELATED APPLICATION

This application claims priority to and the benefit of Korean Patent Application No. 10-2013-0152644, filed on Dec. 9, 2013, in the Korean Intellectual Property Office, the entire content of which is incorporated herein in by reference.

BACKGROUND

1. Field

Aspects of the present invention relate to a battery module.

2. Description of the Related Art

Unlike primary batteries, secondary batteries are capable of being recharged. Secondary batteries are widely used in vehicles, i.e., automobiles, as well in electronic devices, i.e., cellular phones and portable computers.

Secondary batteries may include battery modules each having a plurality of secondary batteries electrically connected to each other. Components of such battery modules are electrically connected. For example, the components of such battery modules may be electrically connected to each other through mechanical coupling structures. Accordingly, the stability of the mechanical coupling of components may affect the stability of the electric coupling of the components.

SUMMARY

One or more embodiments of the present invention relate to a battery module.

Additional aspects of the present invention will be set forth in part in the description which follows and, in part, will be apparent from the description, or may be learned by practice of the presented embodiments.

According to one or more embodiments of the present invention, a battery module includes a plurality of unit batteries a holder accommodating the unit batteries and including a pin extending from the holder, a protective circuit module electrically coupled to the plurality of unit batteries, and a coupling member coupled to the pin to fix the protective circuit module to the holder.

The pin and the coupling member may each be formed of a metallic material, and may be coupled to each other by a welding or soldering process in which at least one of the pin and the coupling member is melted and solidified.

The pin and the holder may be integrally formed by insert molding.

The holder may include a boss supporting the protective circuit module.

The pin may be on the boss and may be integrally formed with the boss.

The coupling member may include a solder material.

The protective circuit module may define a coupling opening configured to receive the pin.

The coupling member may be coupled to the pin inserted through the coupling opening such that the protective circuit module is between the holder and the coupling member.

The coupling opening may have a v-shaped cross-section with a downwardly decreasing inner diameter.

The coupling member may include a metal piece on the protective circuit module.

The protective circuit module may define a coupling opening, and the metal piece may be on the coupling opening.

The metal piece and the pin may coupled to each other by welding.

The protective circuit module may define a coupling opening and the metal piece may be positioned to correspond with the coupling opening.

The metal piece may extend over the coupling opening.

According to one or more embodiments of the present invention, a battery module includes at least one battery pack including a plurality of unit batteries and a holder accommodating the unit batteries, the holder including a pin extending from the holder, a protective circuit module configured to control charging and discharging of the battery pack, a bus bar coupling the battery pack and the protective circuit module, and a coupling member configured to be coupled to the pin, coupling the protective circuit module to the holder, wherein the protective circuit module defines a coupling opening, and the coupling member is at a position corresponding to the coupling opening.

The pin and the coupling member may be coupled together while at least one of the pin and the coupling member is melted and solidified.

The holder may include a boss extending toward the protective circuit module and configured to support the protective circuit module.

The pin may be integrally formed with the boss.

The pin may extend through the coupling opening, and the coupling member may be coupled to the pin having passed through the coupling opening.

The coupling member may include a solder material for coupling with the pin.

The coupling opening may have a v-shaped cross-section with a downwardly decreasing inner diameter.

The coupling member may include a metal piece, and the metal piece may be coupled to the pin.

The metal piece may extend over the coupling opening.

BRIEF DESCRIPTION OF THE DRAWINGS

These and/or other aspects of embodiments of the present invention will become apparent and more readily appreciated from the following description of the embodiments, taken in conjunction with the accompanying drawings, in which.

DETAILED DESCRIPTION

Reference will now be made in detail to various embodiments, examples of which are illustrated in the accompanying drawings. Effects and features of the embodiments, and implementation methods thereof will be clarified through the following descriptions given with reference to the accompanying drawings. Accordingly, the embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, the embodiments of the present invention will be described in detail with reference to the accompanying drawings. In the drawings, like reference numerals denote like elements, and overlapping descriptions thereof will be omitted.

In the following descriptions of the embodiments, although the terms "first and second" are used to describe various elements, these elements should not be limited by these terms. These terms are only used to distinguish one element from another element.

In the following descriptions of the embodiments, the terms of a singular form may include plural forms unless referred to in the contrary.

In the following descriptions of the embodiments, the meaning of "include," "comprise," "including," or "comprising," specifies a property, a region, a fixed number, a step, a process, an element, and/or a component, but does not exclude other properties, regions, fixed numbers, steps, processes, elements, and/or components.

It will be understood that when something such as an element is referred to as being "above" or "on" another element, it can be directly on the other element, or intervening elements may also be present.

In the drawings, the sizes of elements may be exaggerated for clarity. For example, in the drawings, the size or thickness of each element may be arbitrarily shown for illustrative purposes, and thus the present invention should not be construed as being limited thereto.

Figure 1:
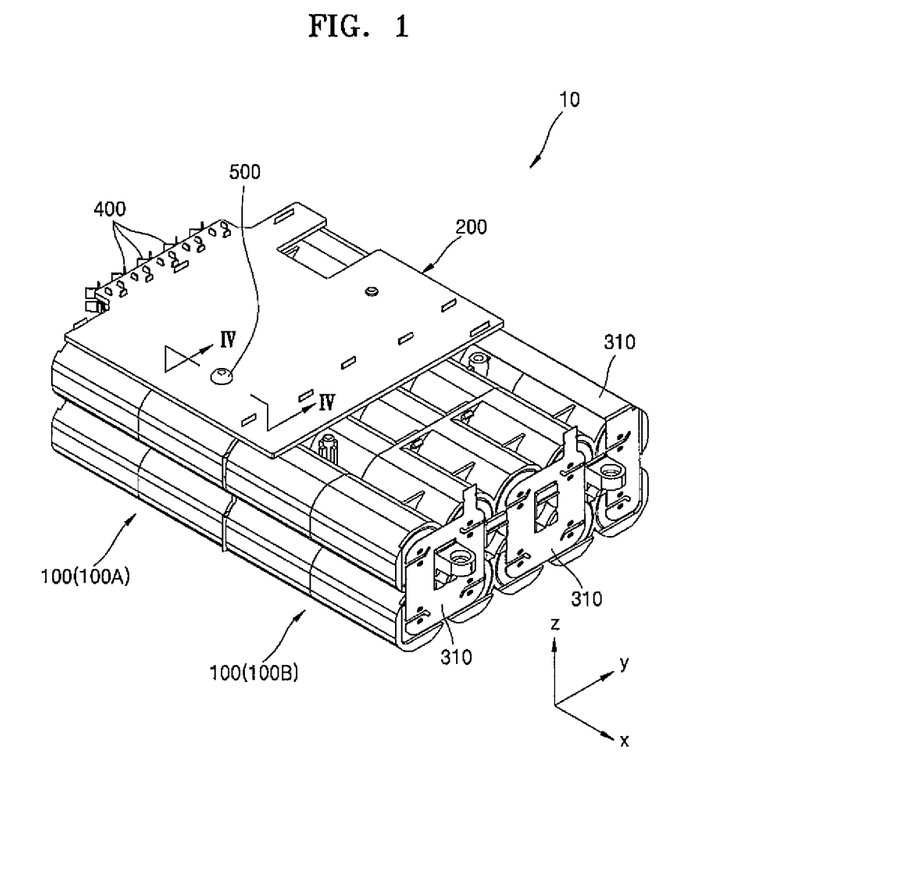
FIG. 1 is a perspective view illustrating a battery module according to an embodiment of the present invention.
Figure 2:
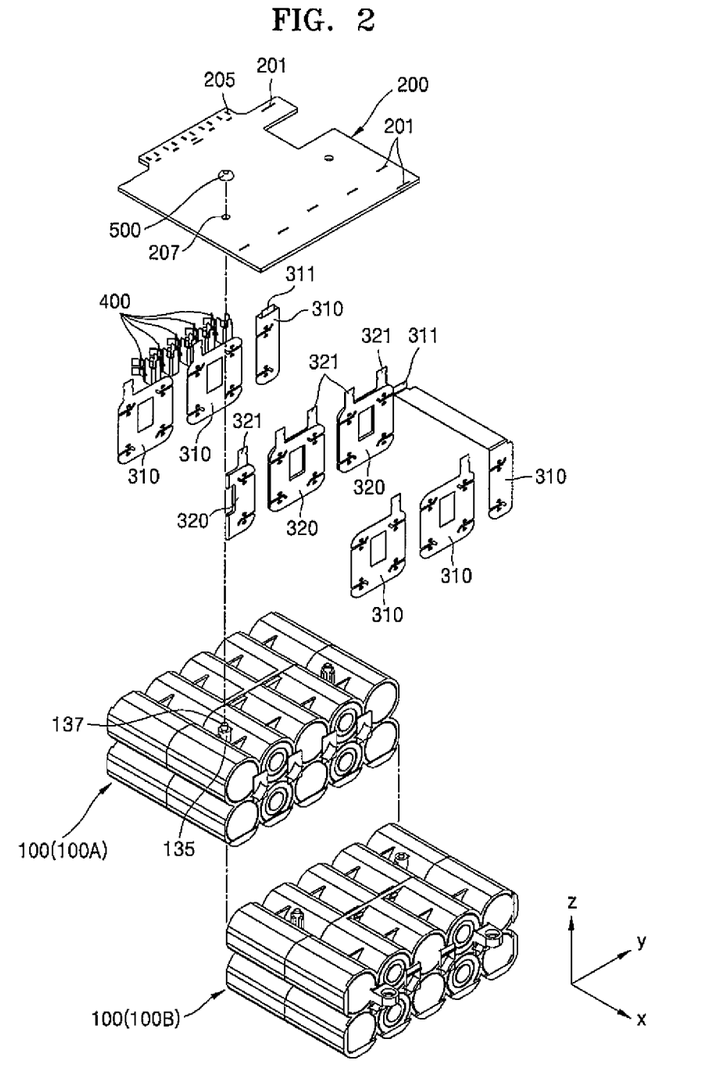
FIG. 2 is an exploded perspective view illustrating the battery module of FIG. 1.
Figure 3:
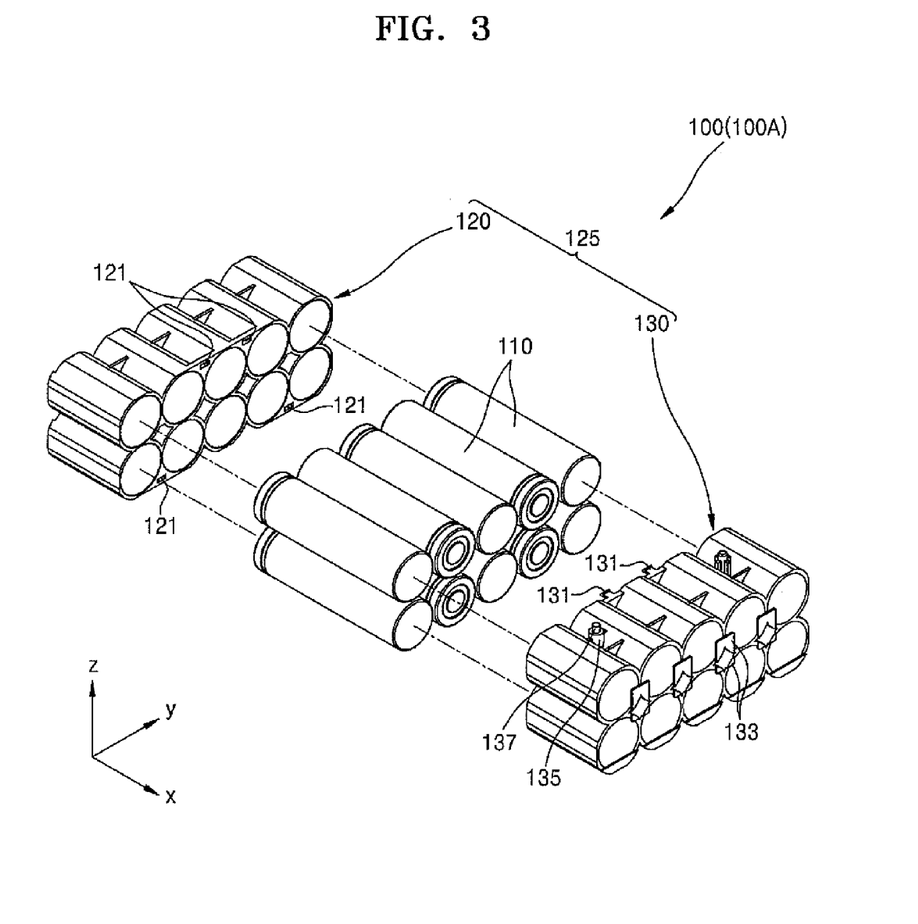
FIG. 3 is an exploded perspective view illustrating a battery pack depicted in FIG. 1.

FIG. 1 is a perspective view illustrating a battery module 10 according to an embodiment of the present invention, FIG. 2 is an exploded perspective view illustrating the battery module 10 of FIG. 1, and FIG. 3 is an exploded perspective view illustrating a battery pack 100 depicted in FIG. 1.

Referring to FIGS. 1 through 3, the battery module 10 according to an embodiment may include at least one battery pack 100, each including a plurality of unit batteries 110 and a holder 125; and a protective circuit module 200. The protective circuit module 200 may be fixed to the battery pack 100 by coupling a coupling member 500 to a pin 137 of the holder 125.

In this embodiment, the battery module 10 includes a first battery pack 100A and a second battery pack 100B. However, the battery module 10 is not limited thereto. In another embodiment, the battery module 10 may include a single battery pack 100 or three or more battery packs 100.

Referring to FIG. 3, the battery pack 100 may include the unit batteries 110 and the holder 125 accommodating the unit batteries 110.

Each of the unit batteries 110 according to an embodiment may have a cylindrical shape. The unit batteries 110 according to this embodiment are rechargeable batteries such as nickel-cadmium (Ni—Cd) batteries, nickel-hydrogen (Ni—H) batteries, or lithium (Li) ion batteries. Lithium ion batteries have a high energy density per weight and an operating voltage of about 3 times the operating voltage of Ni—Cd batteries or Ni—H batteries widely used as power sources of portable electronic devices. Therefore, lithium ion batteries may be versatile and, thus, used for various purposes.

The holder 125, according to an embodiment, may accommodate the unit batteries 110 of the respective battery packs 100. The holder 125 may be formed of an electric insulation material such as a plastic. The holder 125 may include a first holder 120 and a second holder 130. According to an embodiment, the first and second holders 120 and 130 may be coupled to each with the unit batteries 110 positioned therebetween. For example, in an embodiment, the first holder 120 may have recesses 121, and the second holder 130 may have protrusions 131 for coupling with the recesses 121.

The first and second holders 120 and 130, according to an embodiment, may surround lateral surfaces of the unit batteries 110, and both end surfaces of the unit batteries 110 (surfaces of the unit batteries 110 exposed in the x-axis direction shown in FIG. 3) may be exposed to the outside. In this embodiment, the second holder 130 may include stoppers 133 and the first holder 120 may include stoppers 133 configured to prevent the unit batteries 110 from being separated from the first and second holders 120 and 130 in the x-axis direction.

In an embodiment, the holder 125 may include a boss 135 configured to support the protective circuit module 200 electrically connected to the unit batteries 110. The boss 135, according to this embodiment, may extend and protrude toward the protective circuit module 200 to support a lower side of the protective circuit module 200. In the embodiment shown in FIG. 3, the boss 135 is shown on the second holder 130. However, the location of the boss 135 is not limited thereto. In another embodiment of the present invention, the boss 135 may be on the first holder 120, or bosses 135 may be on each of the first and second holders 120 and 130.

In an embodiment, the pin 137 may be integral with or at the boss 135, or the pin 137 and the boss 135 may be coupled by an interference fit, and the protective circuit module 200 may be connected to the holder 125 by coupling the coupling member 500 and the pin 137. For example, in an embodiment, the pin 137 may be coupled to the coupling member 500 through a coupling opening 207 in the protective circuit module 200. In an embodiment, the coupling member 500 may be coupled to an upper portion of the pin 137 positioning the protective circuit module 200 is between the boss 135 of the holder 125 and the coupling member 500. The coupling between the pin 137 and the coupling member 500 is described in more detail with reference to FIG. 4, below.

Referring back to the embodiment shown in FIGS. 1 and 2, the protective circuit module 200 is electrically connected to at least one battery pack 100 in order to control charging and discharging operations of the battery pack 100 and to prevent overheating and or possible results that may occur due to overcharging, over-discharging, or overcurrent, such as an explosion.

in an embodiment, bus bars 310 and 320 may electrically connect the battery pack 100 and the protective circuit module 200. For example, in an embodiment, the bus bars 310 and 320 may electrically connect the unit batteries 110 in at least one battery pack 100 to the protective circuit module 200.

As described above with reference to FIG. 3, the holder 125 may not cover the end surfaces of the unit batteries 110 such that these end surfaces of the unit batteries 110 may be exposed in one direction, for example in the x-axis direction. In these embodiments, the bus bars 310 and 320 may be coupled to the exposed end surfaces of the unit batteries 110 for electric connection with the unit batteries 110, for example, by welding. In this embodiment, connection parts 311 and 321, extending from edges of the bus bars 310 and 320, may be coupled to first connection openings 201 in the protective circuit module 200. For example, the connection parts 311 and 321 may be inserted into the first connection openings 201 and soldered thereto for electric connection with the protective circuit module 200.

In this embodiment, the battery module 10 includes a plurality of battery packs 100 (i.e., at least the first and second battery packs 100A and 100B). In this embodiment, some of the bus bars 310 and 320, for example, the bus bars 320 shown in FIG. 3, may electrically connect the first and second battery packs 100A and 100B to each other. For example, in an embodiment, the bus bars 320 may be positioned between the first and second battery packs 100A and 100B and may be coupled, for example, welded, to the unit batteries 110 of the first and second battery packs 100A and 100B connecting the unit batteries 110 of the first and second battery packs 100A and 100B in series and/or in parallel.

A connector 400, shown in the embodiment illustrated in FIG. 1, may be configured to supply electric power stored in the battery module 10 to an external device. For example, the connector 400 may supply the electric power stored in the battery module 10 to an external device such as an electric vehicle or a home appliance.

The connector 400, according to an embodiment, may be electrically connected to the protective circuit module 200. For example, the connector 400 may include connection tabs configured to be inserted in second connection openings 205 in the protective circuit module 200, and, for example, may be soldered thereto for electrical connection with the protective circuit module 200.

The protective circuit module 200 may be positioned on the holder 125 and may be fixed thereto by coupling the coupling member 500 to the pin 137. In this embodiment, at least one of the pin 137 and the coupling member 500 may be melted and solidified when the pin 137 and the coupling member 500 are coupled together. For example, the pin 137 and the coupling member 500 may be coupled together by soldering or welding.

In an example for comparison with the embodiment of the present invention, the protective circuit module 200 may be fixed to the holder 125 using a bolt or screw connection. In this comparative example, however, the protective circuit module 200 may suffer damage such as cracks or a break due to a force applied to tighten the bolt or screw, which may be excessive. Furthermore, if the battery module 10 in this comparative example is vibrated or dropped and experiences an impact, the bolt or screw connection may be loosened. For example, in a comparative example where the protective circuit module 200 is fixed to the holder 125 by tightening a bolt or screw thereto via rotation of the bolt or screw, the tightened bolt or screw may be loosened by vibration or impact which may rotate the bolt or screw in the counter-direction, possibly causing the protective circuit module 200 to be separated from the battery module 10. If the protective circuit module 200 does separate from the battery module 10, the electrical connection between the protective circuit module 200 and the battery pack 100 may be broken.

In another example for comparison with the present embodiment, the protective circuit module 200 may be fixed to the holder 125 by a hook structure connection. In this comparative example, if the battery module 10 is vibrated or dropped and experiences an impact, the hook structure may disconnect and the protective circuit module 200 may be separated from the battery module 10.

However, the pin 137 and the coupling member 500, according to an embodiment of the present invention, are coupled together by melting and solidifying at least one of the pin 137 and the coupling member 500, fixing the protective circuit module 200 to the holder 125. Therefore, in this embodiment, an excessive force applied to the battery module 10 when the pin 137 and the coupling member 500 are coupled together is less likely to result in separation of the protective circuit module 200 from the battery module 10, even when the battery module 10 is vibrated or dropped and experiences an impact.

Figure 4:
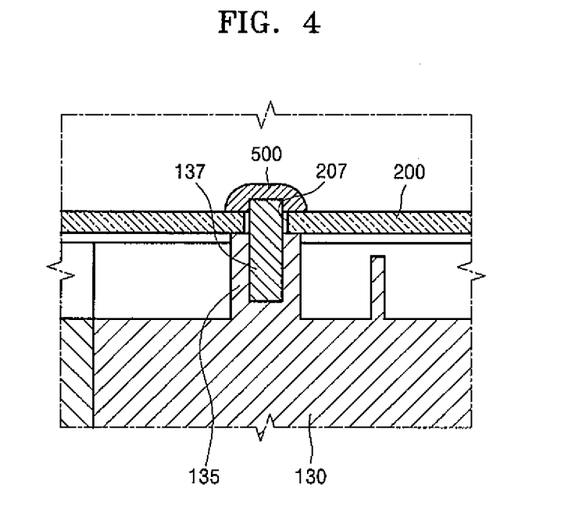
FIG. 4 is a cross-sectional view taken along the. line IV-IV of FIG. 1 to illustrate a coupling member coupled to a pin, according to an embodiment of the present invention.

FIG. 4 is a cross-sectional view taken along the line IV-IV of FIG. 1 to illustrate the coupling member 500 coupled to the pin 137, according to an embodiment of the present invention.

Referring to the embodiment shown in FIG. 4, the boss 135 of the holder 125 may support the protective circuit module 200, and the pin 137 in the boss 135 may be inserted into the coupling opening 207 of the protective circuit module 200 and coupled to the coupling member 500. The pin 137 may be formed of a metallic material, and the holder 125 may be formed of an insulation material. In an embodiment, the pin 137 and the holder 125 may be integrally formed, for example by insert molding.

The coupling member 500, according to an embodiment, may include a solder material and may be coupled to the pin 137 of the holder 125 through a soldering process. During the soldering process, according to an embodiment, the solder material may be melted and solidified while the coupling member 500 is coupled to the pin 137 inserted through the coupling opening 207 of the protective circuit module 200. Some of the solder material may flow into the coupling opening 207, in an embodiment. A coupled connection between the coupling member 500 including the solder material and the pin 137 formed of a metallic material is a stronger connection than bolt or screw coupling in terms of resistance to vibration or impact, eliminating or greatly reducing any resulting separation of the protective circuit module 200 from the holder 125. In addition, in an embodiment where the protective circuit module 200 is fixed to the holder 125 in the manner described above, no excessive force is required to complete the connection, and thus, the protective circuit module 200 and/or the holder 125 are not likely to be damaged or broken by such an excessive force required for coupling.

Figure 5:
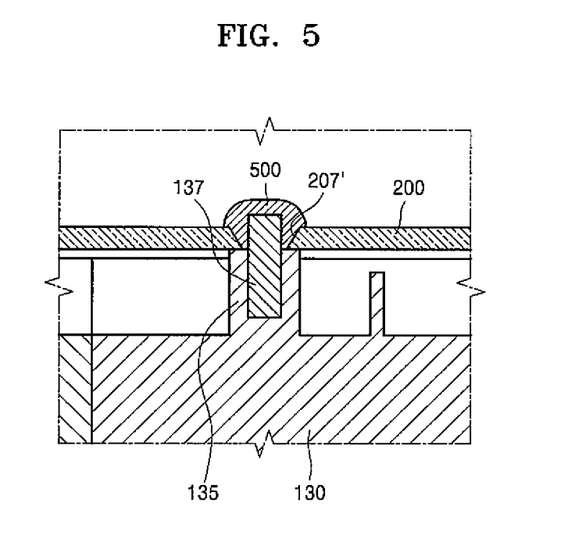
FIG. 5 is a cross-sectional view illustrating another embodiment of a coupling member coupled to a pin.

FIG. 5 is a cross-sectional view illustrating another embodiment of the coupling member 500 coupled to the pin 137.

Referring to the embodiment shown in FIG. 5, a coupling opening 207' in the protective circuit module 200 may have a sloped or tapered shape such that the coupling opening 207' has a downwardly decreasing inner diameter. According to this embodiment, the coupling opening 207' may have an approximately V-shaped cross-section. Therefore, during a soldering process, for example, according to this embodiment, molten solder may easily flow along the coupling opening 207', increasing the coupling area (or contact area) between the solder material and the pin 137 inserted in the coupling opening 207'.

Figure 6A:
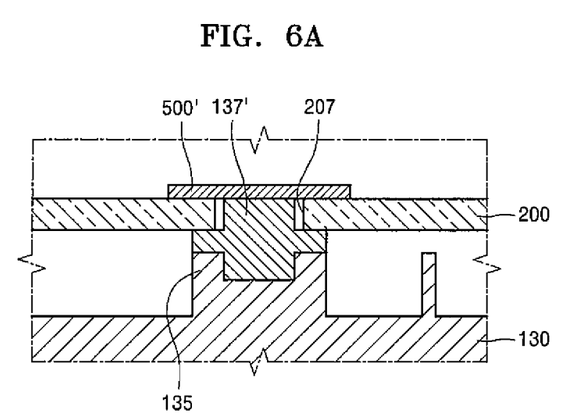
FIGS. 6A to 6C are cross-sectional views illustrating various coupling members coupled to respective pins, according to additional embodiments of the present invention.
Figure 6B:
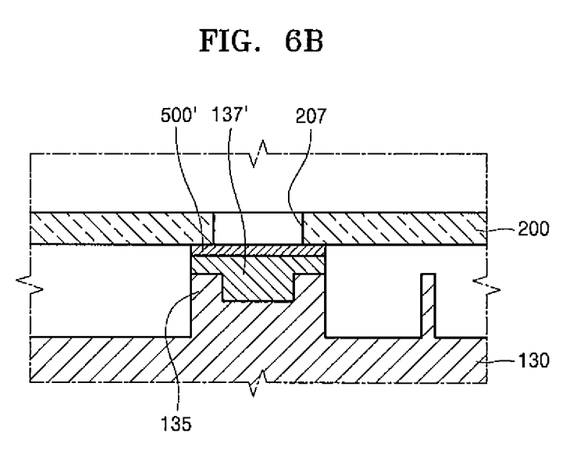
Figure 6C:
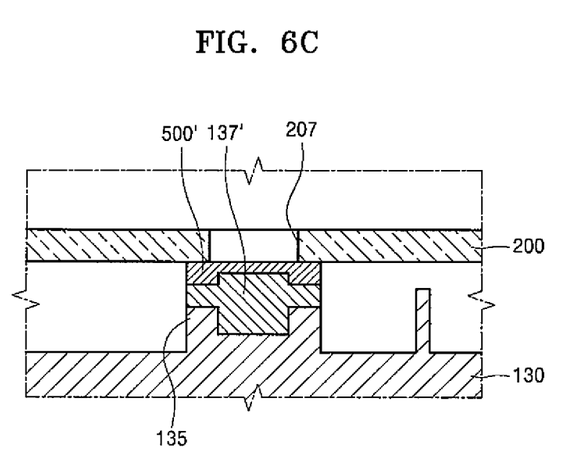

FIGS. 6A to 6C are cross-sectional views each illustrating a coupling member 500' coupled to a pin 137' according to additional embodiments of the present invention.

In some the embodiments described with reference to FIGS. 1 to 4, the coupling member 500 includes solder material, and the protective circuit module 200 is connected to the holder 125 as the solder is melted and solidified. However, in another embodiment, both the coupling member 500' and the pin 137' may be partially melted and solidified while the protective circuit module 200 is coupled to the holder 125.

Referring to the embodiments in each of FIGS. 6A through 6C, the coupling member 500' and the pin 137' may be coupled together while being partially melted and solidified. The coupling member 500', according to these embodiments, may include a metal piece and may be coupled to the pin 137' by welding. During welding, according to these embodiments, the pin 137' and the coupling member 500' including a metal piece may be coupled together while both the pin 137' and the coupling member 500' are partially melted and solidified.

Coupling between the coupling member 500' including a metal piece and the pin 137' formed of a metallic material, according to these embodiments, is stronger than bolt, screw, or hook coupling in terms of resistance to vibration or impact, eliminating or greatly reducing any resulting separation of the protective circuit module 200 from the holder 125. In addition, in an embodiment where the protective circuit module 200 is fixed to the holder 125 in the manner described above, no excessive force is required to complete the connection, and, thus, the protective circuit module 200 and/or the holder 125, and thus the protective circuit module 200 or the holder 125 are not likely to be damaged or broken by such an excessive force required for coupling.

The coupling member 500' including a metal piece, according to an embodiment, may be on the coupling opening 207 of the protective circuit module 200. As shown in each of FIGS. 6A through 6C, the metal piece, according to these embodiments, may be connected to the protective circuit module 200 and may cover the coupling opening 207 of the protective circuit module 200 at a top or bottom surface of the coupling opening 207.

The pin 137', according to an embodiment, may contact the metal piece on the coupling opening 207 of the protective circuit module 200. The shape of the pin 137' is not limited. For example, as shown in FIGS. 6A through 5C, the pin 137' may extend to cover an upper surface of the boss 135, and may additionally extend a distance upward or downward.

In these embodiments, where a welding process is performed after the protective circuit module 200 is placed on the holder 125 to bring the metal piece into contact with the pin 137', the metal piece and the pin 137' may be coupled together while both the metal piece and the pin 137' are partially melted and solidified. More specifically, according to these embodiments, the metal piece and the pin 137' may be brought into direct contact with each other and coupled to each other.

As described above, according to the one or more of the above embodiments of the present invention, the battery module 10 may be easily assembled, and the mechanical/electrical connection of the battery module 10 may be stably maintained even if the battery module 10 is vibrated or experiences an impact.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention.

What is claimed is:

1. A battery module comprising:
   a plurality of unit batteries;
   a holder accommodating the unit batteries, the holder comprising a boss comprising an electrically insulating material and a pin having a smooth exterior surface comprising an electrically conductive material, the pin being coupled to the holder by an interference fit and extending from the holder;
   a protective circuit module electrically coupled to the plurality of unit batteries; and
   a coupling member coupled to the pin to fix the protective circuit module to the holder.

2. The battery module of claim 1, wherein the pin comprises a metallic material and the coupling member comprises a metallic material, and wherein the pin and the coupling member are coupled to each other by a weld or by solder in which at least one of the pin and the coupling member has been melted and solidified.

3. The battery module of claim 1, wherein the pin and the holder are integrally formed by insert molding.

4. The battery module of claim 1, wherein the boss supports the protective circuit module.

5. The battery module of claim 1, wherein the pin is on the boss and integrally formed with the boss.

6. The battery module of claim 1, wherein the coupling member comprises a solder material.

7. The battery module of claim 6, wherein the protective circuit module defines a coupling opening accommodating the pin.

8. The battery module of claim 7, wherein the coupling member is coupled to the pin such that the protective circuit module is between the holder and the coupling member.

9. The battery module of claim 7, wherein the coupling opening has a v-shaped cross section with a downwardly decreasing inner diameter.

10. The battery module of claim 1, wherein the coupling member comprises a metal piece on the protective circuit module.

11. The battery module of claim 10, wherein the protective circuit module defines a coupling opening, and the metal piece is on the coupling opening.

12. The battery module of claim 10, wherein the metal piece and the pin are coupled to each other by welding.

13. The battery module of claim 10, wherein the protective circuit module defines a coupling opening, and the metal piece is positioned to correspond with the coupling opening.

14. The battery module of claim 13, wherein the metal piece extends over the coupling opening.

* * * * *